(12) United States Patent
Yanagisawa et al.

(10) Patent No.: US 8,491,131 B2
(45) Date of Patent: Jul. 23, 2013

(54) PROJECTOR

(75) Inventors: Hirotaka Yanagisawa, Azumino (JP); Kenshi Sakai, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 1109 days.

(21) Appl. No.: 12/345,156

(22) Filed: Dec. 29, 2008

(65) Prior Publication Data

US 2009/0180081 A1 Jul. 16, 2009

(30) Foreign Application Priority Data

Jan. 11, 2008 (JP) .................................. 2008-003969

(51) Int. Cl.
*G03B 21/26* (2006.01)
(52) U.S. Cl.
USPC ........................................... 353/94; 362/523
(58) Field of Classification Search
USPC ................ 353/94, 37, 64; 362/523, 234, 235, 362/237, 285; 359/196.1
See application file for complete search history.

(56) References Cited

U.S. PATENT DOCUMENTS

| 5,153,419 A | * | 10/1992 | Takahashi | .................. | 250/201.1 |
| 7,559,671 B2 | * | 7/2009 | Lee et al. | ...................... | 362/234 |
| 7,758,194 B2 | * | 7/2010 | Lin et al. | .......................... | 353/87 |
| 2005/0243287 A1 | * | 11/2005 | Pate et al. | ...................... | 353/87 |
| 2006/0256295 A1 | * | 11/2006 | Lang et al. | ...................... | 353/37 |

FOREIGN PATENT DOCUMENTS

| JP | A-2000-003612 | 1/2000 |
| JP | A-2001-359025 | 12/2001 |
| WO | WO 2004/034142 A1 | 4/2004 |

* cited by examiner

*Primary Examiner* — Georgia Y Epps
*Assistant Examiner* — Jerry Brooks
(74) *Attorney, Agent, or Firm* — Oliff & Berridge, PLC

(57) ABSTRACT

A projector includes a first light source section a second light source section, a light combining section adapted to combine the first light beam and the second light beam, an adjustment device adapted to adjust a light path of the first light beam and a light path of the second light beam, respectively, in two steps, an homogenizing optical system adapted to equalize the first light beam and the second light beam processed by the light combining section, a light modulation section adapted to modulate the light beam from the homogenizing optical system in accordance with image information, and a projection optical system adapted to project an image beam processed by the light modulation section.

8 Claims, 8 Drawing Sheets

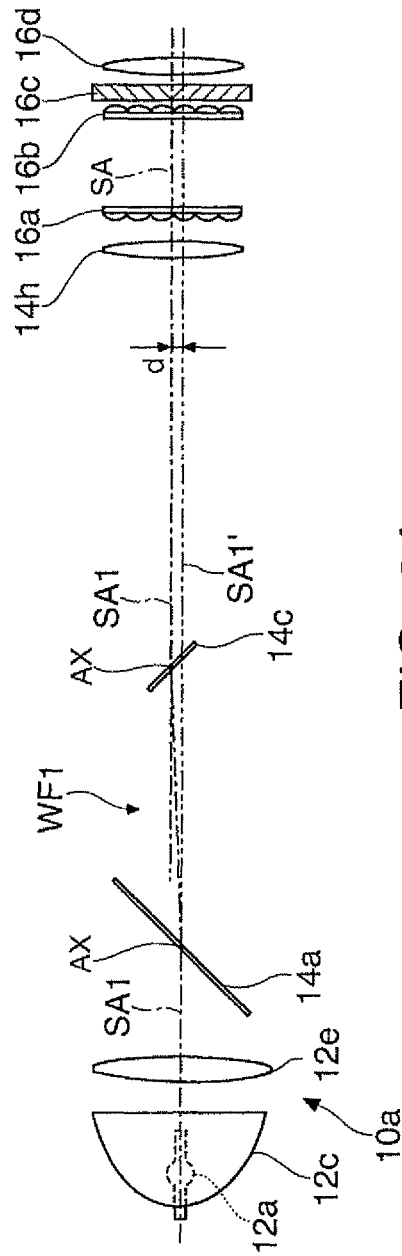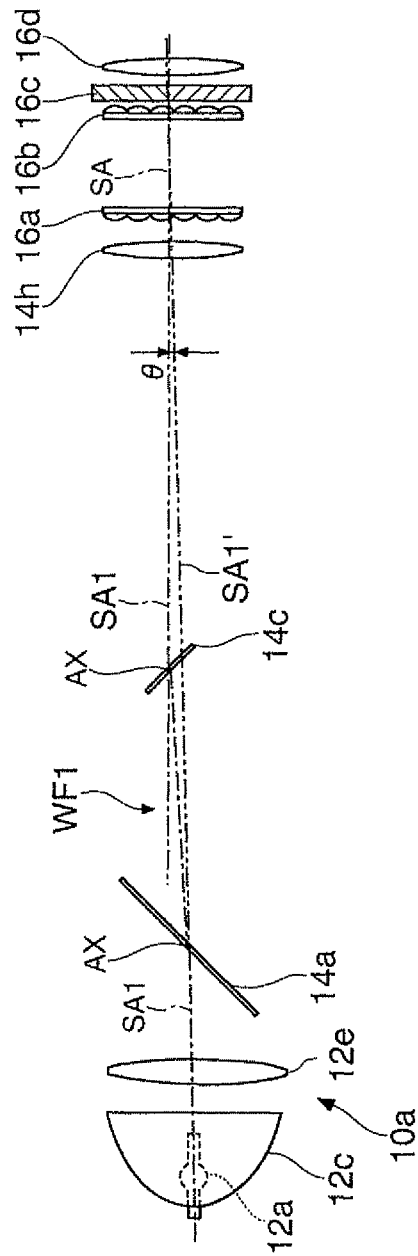

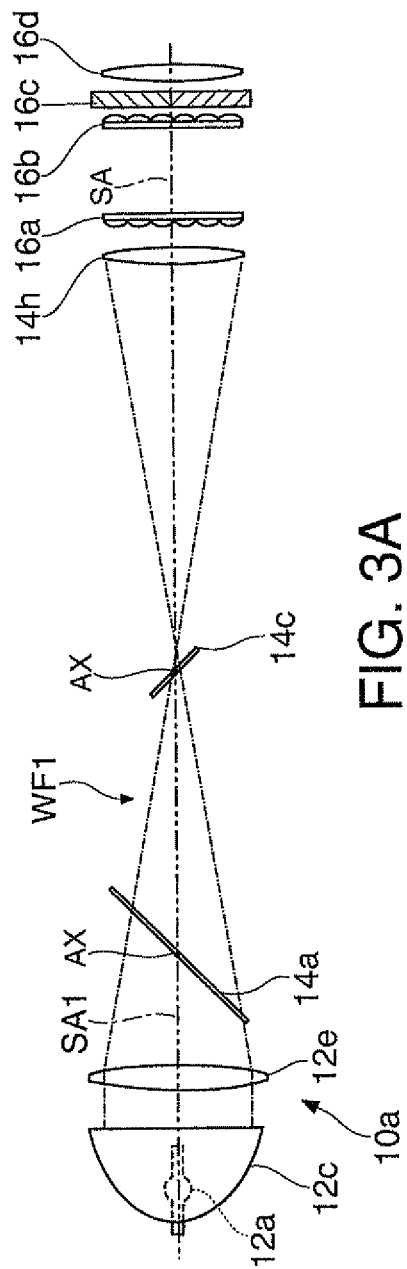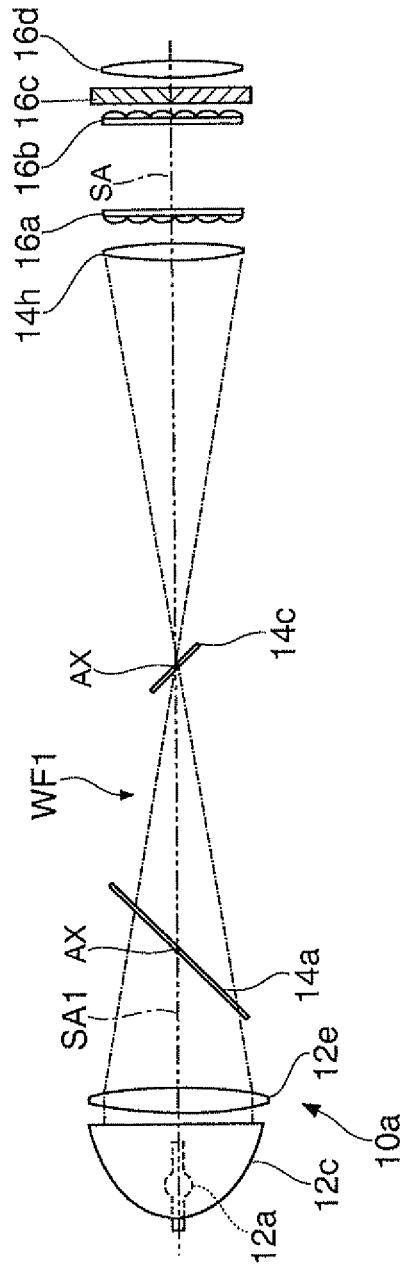

PROJECTOR

BACKGROUND

1. Technical Field

The present invention relates to a projector adapted to project an image formed by a light modulation device such as a liquid crystal panel on a screen.

2. Related Art

As a projector of the related art, there exists a projector provided with two discharge lamps, and adapted to combine the light paths thereof while folding the light paths with two reflecting mirrors and a reflecting prism (see JP-A-2000-3612 (Patent Document 1)).

As another projector, there exists a projector provided with two lamp unit sections and adapted to combine the light paths thereof while folding the light paths in two steps with a combination mirror section (see WO2004/034142 (Patent Document 2)). In this projector, the luminance distributions of the two discharge lamps are adjusted by a position adjustment of the combination mirror section. It should be noted that the Patent Document 2 also discloses a projector provided with two lamp unit sections and adapted to combine the light paths thereof while folding the light paths with two mirrors as a still another projector, wherein each of the mirrors is rotated around an axis perpendicular to a plane including the optical axis.

However, since it is required in the projector disclosed in the Patent Document 1 to guide the light beams from the two discharge lamps to each of cells of integrator lens after appropriately aligning the light beams, it is difficult to combine the light beams from the two discharge lamps without omission to use them as the illumination light. For example, in the case in which there exists misalignment in an attachment angle of the mirror disposed in front of the integrator lens or misalignment in attachment positions of the two discharge lamps, the probability of the light source image running off either of the cells of the integrator lens is increased, and there is a possibility that the luminance of the illumination is caused to drop, and that the illumination distribution is disturbed.

Further, in the projector disclosed in the Patent Document 2, although the uniformity can be assured using the combination mirror section and the two mirrors even in the case in which one of the lamp unit sections is only lit, the uniformity is not necessarily assured in the case in which the light beams from the both lamp unit sections are used simultaneously. In other words, in the case in which the combination mirror section is moved, or the two mirrors are rotated, both of the incident position and the incident angle of the illumination light into the integrator lens change simultaneously, and therefore, the precise alignment of the illumination light taking the incident position and the incident angle into consideration is difficult.

SUMMARY

Therefore, an advantage of some aspects of the invention is to provide a projector capable of combining the light beams from the two lamps without omission to use them as the illumination light, and in particular of allowing the adjustment of the incident position and the incident angle of the illumination light into the integrator lens in a separate manner.

A projector according to a first aspect of the invention includes:

a first light source section having a first arc tube and a first concave mirror and adapted to emit a first light beam, a second light source section having a second arc tube and a second concave mirror and adapted to emit a second light beam, a light combining section adapted to combine the first light beam and the second beam, an adjustment device adapted to adjust a light path of the first light beam and a light path of the second light beam, respectively, in two steps, an homogenizing optical system adapted to homogenize the first light beam and the second light beam processed by the light combining section, a light modulation section adapted to modulate the light beam from the homogenizing optical system in accordance with image information, and a projection optical system adapted to project an image beam processed by the light modulation section.

According to the projector described above, since it becomes possible for the adjustment device to adjust the arrangements of the light paths of the first light beam and the second light beam, respectively, in two steps, the adjustments of the first light beam and the second light beam from the respective light source sections become more multifactor adjustments, and it becomes possible to combine the first and second light beams from the respective light source sections without omission and to use as the illumination light.

According to a specific aspect of the invention, in the projector described above, the adjustment device adjusts the first light beam and the second light beam with respect to an illumination position and an illumination angle. In this case, by adjusting the first and second light beams from the respective light source sections with respect to the illumination position and the illumination angle, it becomes possible to perform accurate alignment of the first and second light beams from the respective light source sections, and to input the light beams to the homogenizing optical system in the subsequent stage in a suitable condition therewith.

Further, according to another aspect of the invention, in the projector described above, the light combining section includes a first light path folding section having two mirrors disposed on a first illumination light path between the first light source section and the homogenizing optical system so that the angles of the two mirrors can be adjusted while avoiding interference with the second light beam, and a second light path folding section having two mirrors disposed on a second illumination light path between the second light source section and the homogenizing optical system so that the angles of the two mirrors can be adjusted while avoiding interference with the first light beam, and the adjustment device folds each of the first illumination light path and the second illumination light path in two steps with the two mirrors provided to each of the first light path folding section and the second light path folding section, thereby adjusting an arrangement of the light paths. In this case, the illumination position and the illumination angle can individually be adjusted with respect to the first illumination light path and the second illumination light path.

Further, according to still another aspect of the invention, in the projector described above, the light combining section includes a first light path folding section having at least one mirror disposed on a first illumination light path between the first light source section and the homogenizing optical system so that the angle of the at least one mirror can be adjusted while avoiding interference with the second light beam, a second light path folding section having at least one mirror disposed on a second illumination light path between the second light source section and the homogenizing optical system so that the angle of the at least one mirror can be adjusted while avoiding interference with the first light beam, and a common mirror disposed at a position, at which the first illumination light path and the second illumination light path overlap with each other, so that an angle of the common mirror can be adjusted, and the adjustment device folds the first illumination light path in two steps with the at least one mirror and the common mirror disposed in the first light path folding section, and folds the second illumination light path in two steps with the at least one mirror and the common mirror disposed in the second light path folding section, thereby adjusting an arrangement of the light paths. In this case, the illumination position and the illumination angle can individually be adjusted with respect to at least one of the first illumination light path and the second illumination light path.

Further, according to still another aspect of the invention, in the projector described above, the first light source section is provided with a first condenser lens on a posterior stage of the first arc tube and the first concave mirror, the second light source section is provided with a second condenser lens on a posterior stage of the second arc tube and the second concave mirror, the light combining section is provided with at least one mirror on each of an illumination path between the first light source section and the homogenizing optical system and an illumination path between the second light source section and the homogenizing optical system, and the adjustment device individually displaces the first condenser lens and the second condenser lens in a predetermined direction in the plane of perpendicular to respective system optical axes, and changes an angle, at which respective one of the light paths is folded by the at least one mirror, thereby adjusting arrangement of the light paths. In this case, the illumination position and the illumination angle can individually be adjusted with respect to at least one of the first illumination light path and the second illumination light path.

Further, according to still another aspect of the invention, in the projector described above, the first condenser lens and the second condenser lens can individually be displaced along the system optical axes. In this case, focusing positions on the optical axes by the first condenser lens and the second condenser lens can be adjusted, and the misalignment of the light beam on the mirror included in the light combining section, which causes the partial blocking of the light beam, can be prevented.

Further, according to still another aspect of the invention, in the projector described above, the first concave mirror of the first light source section converges a light beam emitted from the first arc tube, the second concave mirror of the second light source section converges a light beam emitted from the second arc tube, the light combining section is provided with at least one mirror on each of an illumination path between the first light source section and the homogenizing optical system and an illumination path between the second light source section and the homogenizing optical system, and the adjustment device individually displaces the first light source section and the second light source section in a predetermined direction in the plane of perpendicular to respective system optical axes, and changes an angle, at which respective one of the light paths is folded by the at least one mirror, thereby adjusting arrangement of the light paths. In this case, the illumination position and the illumination angle can individually be adjusted with respect to at least one of the first illumination light path and the second illumination light path.

Further, according to still another aspect of the invention, in the projector described above, the first light source section and the second light source section can individually be displaced along the system optical axes. In this case, focusing positions on the optical axes by the first light source section and the second light source section can be adjusted, and the misalignment of the light beam on the mirror included in the light combining section, which causes the partial blocking of the light beam, can be prevented.

A projector according to another aspect of the invention includes:

a first light source section having a first arc tube, a first concave mirror, and a first condenser lens, and adapted to emit a first light beam, a second light source section having a second arc tube, a second concave mirror, and a second condenser lens, and adapted to emit a second light beam, a light combining section adapted to combine the first light beam and the second beam, an adjustment device displaces the first condenser lens in a predetermined direction in the plane of perpendicular to a system optical axis and displaces the first condenser lens pivot around a first pivot axis in the plane of perpendicular to the system optical axis, and displaces the second condenser lens in a predetermined direction in the plane of perpendicular to the system optical axis and displaces the second condenser lens pivot around a second pivot axis in the plane of perpendicular to the system optical axis, thereby respectively adjusting a light path of the first light beam and a light path of the second light beam, an homogenizing optical system adapted to equalize a combination light beam of the first light beam and the second light beam, a light modulation section adapted to modulate the light beam from the homogenizing optical system in accordance with image information, and a projection optical system adapted to project an image beam processed by the light modulation section.

According to the projector described above, the adjustments of the first light beam and the second light beam from the respective light source sections become more multifactor adjustments, and it becomes possible to combine the first light beam and the second light beam from the respective light source sections without omission to use them as the illumination light. In this case, since the first and second light beams from the respective light source sections can be adjusted individually with respect to the illumination position and the illumination angle, it becomes possible to perform accurate alignment of the first and second light beams from the respective light source sections, and to input the light beams to the homogenizing optical system in the subsequent stage in a suitable condition therewith.

A projector according to another aspect of the invention includes:

a first light source section having a first arc tube and a first concave mirror and adapted to emit a first light beam, a second light source section having a second arc tube and a second concave mirror and adapted to emit a second light beam, a light combining section adapted to combine the first light beam and the second beam, an adjustment device displaces the first light source section in a predetermined direction in the plane of perpendicular to a system optical axis and displaces the first condenser lens pivot around a first pivot axis in the plane of perpendicular to the system optical axis, and displaces the second light source section in a predetermined direction in the plane of perpendicular to the system optical axis and displaces the second condenser lens pivot around a second pivot axis in the plane of perpendicular to the system optical axis, thereby respectively adjusting a light path of the first light beam and a light path of the second light beam, an homogenizing optical system adapted to homogenize a combination light beam of the first light beam and the second light beam, a light modulation section adapted to modulate the light beam from the homogenizing optical system in accordance with image information, and a projection optical system adapted to project an image beam processed by the light modulation section.

According to the projector described above, the adjustments of the first light beam and the second light beam from the respective light source sections become more multifactor adjustments, and it becomes possible to combine the first light beam and the second light beam from the respective light source sections without omission to use them as the illumination light. In this case, since the first and second light beams from the respective light source sections can be adjusted individually with respect to the illumination position and the illumination angle, it becomes possible to perform accurate alignment of the first and second light beams from the respective light source sections, and to input the light beams to the homogenizing optical system in the subsequent stage in a suitable condition therewith.

BRIEF DESCRIPTION OF THE DRAWINGS

The invention will now be described with reference to the accompanying drawings, wherein like numbers reference like elements.

FIGS. 2A and 2B are light path developments for explaining an adjustment of an illumination position and an illumination angle of illumination light according to a first light path folding section.

FIGS. 3A and 3B are light path developments for explaining an adjustment of a light beam size by a condenser lens.

DESCRIPTION OF EXEMPLARY EMBODIMENTS

First Embodiment

Figure 1:
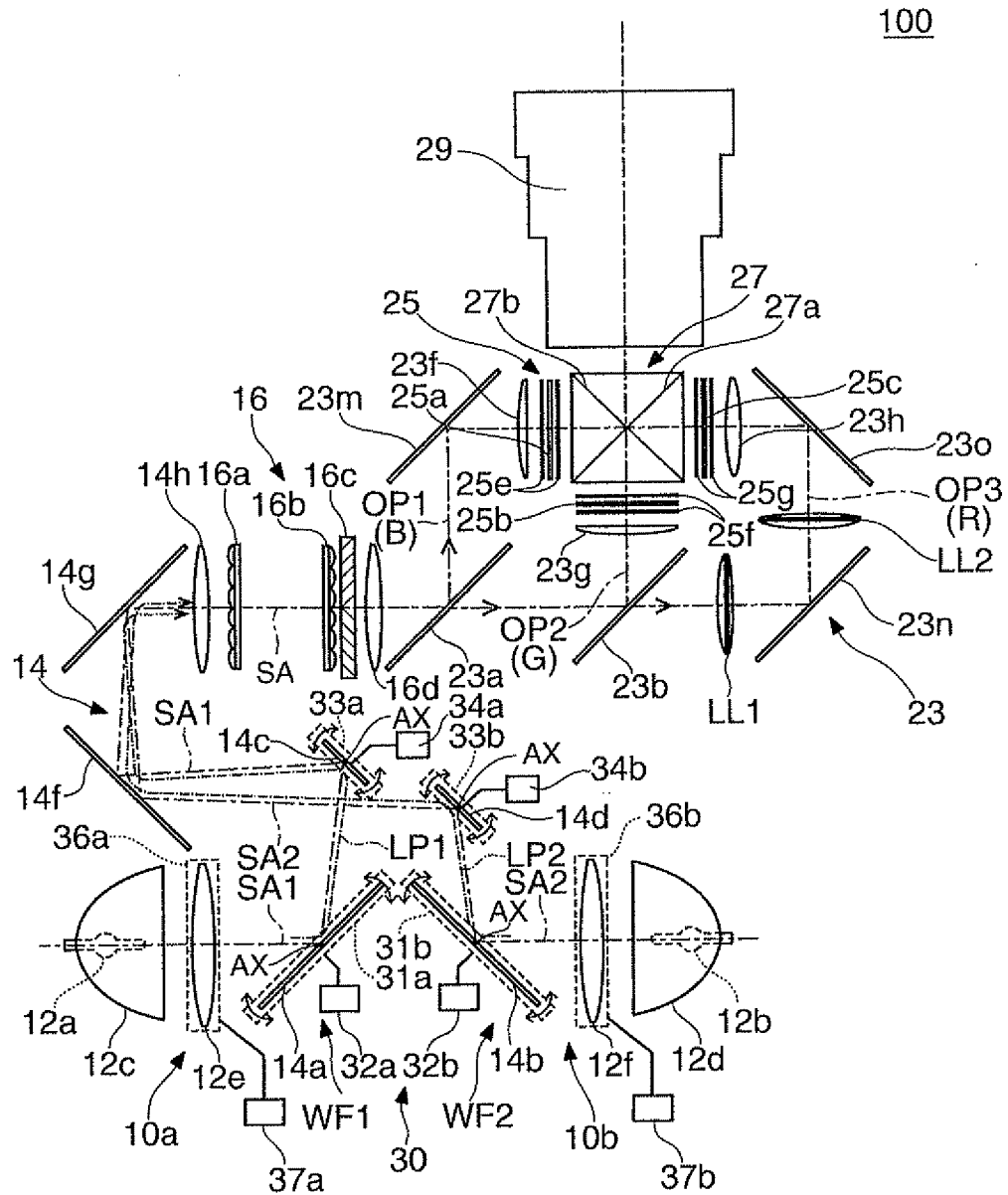
FIG. 1 is a diagram for explaining a projector according to a first embodiment of the invention.

FIG. 1 is a plan view for conceptually explaining a structure of a projector according to a first embodiment of the invention.

The projector 100 is provided with a first light source section 10a for generating source light, a second light source section 10b for similarly generating the source light, a light combining section 14 for combining the light beams emitted from the both light source sections 10a, 10b, an adjustment device 30 for adjusting the light beams emitted from the both light source sections 10a, 10b and passing through the light combining section 14 with respect to the arrangement of the light path, an equalizing (homogenizing) optical system 16 for homogenizing the light beams emitted from the light combining section 14, a color separation system 23 for separating the light beam emitted from the homogenizing optical system 16 into three colors of red, green, and blue, a light modulation section 25 illuminated by the illumination light beams of the respective colors emitted from the color separation system 23, a cross dichroic prism 27 for combining the modulated light beams of the respective colors from the light modulation section 25, and a projection lens 29 as a projection optical system for projecting image light passing through the cross dichroic prism 27 on a screen (not shown).

In the projector 100 described hereinabove, the first light source section 10a is provided with a first arc tube 12a formed of a high-pressure mercury lamp or the like, a first concave mirror 12c of a parabolic shape for reflecting forward the source light emitted from the first arc tube 12a, and a first condenser lens 12e for converging the source light reflected by the first concave mirror 12c. The first light source section 10a has a function of collecting the light beam radiated peripherally from the first arc tube 12a to emit it, thereby supplying the homogenizing optical system 16 with a substantially collimated light beam via the light combining section 14 in cooperation with the second light source section 10b.

Similarly to the first light source section 10a, the second light source section 10b is provided with a second arc tube 12b formed of a high-pressure mercury lamp or the like, a second concave mirror 12d of a parabolic shape for reflecting forward the source light emitted from the second arc tube 12b, and a second condenser lens 12f for converging the source light reflected by the second concave mirror 12d. The second light source section 10b has a function of collecting the light beam radiated peripherally from the second arc tube 12b to emit it, thereby supplying the homogenizing optical system 16 with a substantially collimated light beam in cooperation with the first light source section 10a. Here, the second arc tube 12b has substantially the same optical structure as that of the first arc tube 12a forming the first light source section 10a, the second concave mirror 12d has substantially the same optical structure as that of the first concave mirror 12c forming the first light source section 10a, and the second condenser lens 12f has substantially the same optical structure as that of the first condenser lens 12e forming the first light source section 10a.

The light combining section 14 is provided with first pivoted mirrors 14a, 14b, second pivoted mirrors 14c, 14d, a third fixed mirror 14f, a fourth fixed mirror 14g, and a collimator lens 14h. Here, the first pivoted mirror 14a and the second pivoted mirror 14c are disposed on a first illumination light path (optical path) LP1 extending in parallel to the sheet of the drawing to form a first light path folding section WF1 and have a role of guiding the first light beam from the first light source section 10a to the homogenizing optical system 16 via the third fixed mirror 14f and the fourth fixed mirror 14g. The first light path folding section WF1 is arranged to allow an adjustment operation executed by the adjustment device 30 described later, and it is arranged to be possible to fine tune the arrangement of the first illumination light path LP1 in two steps in accordance with the angle state of the pivoted mirrors 14a, 14c when folding the light path of the first light source section 10a, namely the first illumination light path LP1 two times by both of the pivoted mirrors 14a, 14c. On the other hand, the first pivoted mirror 14b and the second pivoted mirror 14d are disposed on a second illumination light path LP2 extending in parallel to the sheet of the drawing to form a second light path folding section WF2, and have a role of guiding the second light beam from the second light source section 10b to the homogenizing optical system 16 via the third fixed mirror 14f and the fourth fixed mirror 14g. The second light path folding section WF2 is arranged to allow an adjustment operation executed by the adjustment device 30 described later, and it is arranged to be possible to fine tune the arrangement of the second illumination light path (optical path) LP2 in two steps in accordance with the angle state of the pivoted mirrors 14b, 14d when folding the light path of the second light source section 10b, namely the second illumination light path LP2 two times by both of the pivoted mirrors 14b, 14d.

It should be noted that the third and the fourth fixed mirrors 14f, 14g are common mirrors disposed in the area where the first and the second illumination light paths LP1, LP2 are disposed in common. Further, the collimator lens 14h has a role of collimating the first and the second light beams, which are focused once on the vicinities of the second pivoted mirrors 14c, 14d respectively by the condenser lenses 12e, 12f of the both light source sections 10a, 10b, and then diverged, before the first and the second light beams enter the homogenizing optical system 16.

The adjustment device 30 is provided with first support sections 31a, 31b for respectively supporting the first pivoted mirrors 14a, 14b so that the first pivoted mirrors 14a, 14b can pivot around pivot axes AX perpendicular to the sheet of the drawing and can be fixed, second support sections 33a, 33b for respectively supporting the second pivoted mirrors 14c, 14d so that the second pivoted mirrors 14c, 14d can pivot around pivot axes AX perpendicular to the sheet of the drawing and can be fixed, and third support sections 36a, 36b for respectively supporting the condenser lenses 12e, 12f so that the condenser lenses 12e, 12f can be moved along the system optical axes SA1, SA2 and can be fixed. Here, the first and the second support sections 31a, 31b, 33a, 33b include pivoted supporting mechanisms for the respective mirrors 14a, 14b, 14c, and 14d, and rotational position fixing mechanisms for the respective mirrors 14a, 14b, 14c, and 14d. Further, the third support sections 36a, 36b include sliding mechanisms for the both condenser lenses 12e, 12f and sliding position fixing mechanisms for the respective condenser lenses 12e, 12f.

Here, the first pivoted mirror 14a supported by the first support section 31a is driven by, for example, a drive section 32a to pivot appropriately around a pivot axis AX perpendicular to the sheet of the drawing including the system optical axis SA1, thereby adjusting the angle and position of the light beam traveling from the first pivoted mirror 14a towards the second pivoted mirror 14c. Further, the second pivoted mirror 14c supported by the second support section 33a is driven by, for example, a drive section 34a to pivot appropriately around a pivot axis AX perpendicular to the sheet of the drawing including the system optical axis SA1, thereby adjusting the angle and position of the light beam traveling from the second pivoted mirror 14c towards the third fixed mirror 14f. In a manner described above, it is possible to adjust the arrangement of the light path of the first light beam emitted from the first light source section 10a, namely the first illumination light path LP1 in the two steps in the first light path folding section WF1. In other words, since the first light path folding section WF1 is provided, it is possible to fine-adjust the illumination position and the illumination angle of the illumination light entering the lens arrays 16a, 16b of the homogenizing optical system 16 from the first light source section 10a.

FIGS. 2A and 2B are light path developments for explaining the adjustment of the illumination position and the illumination angle of the illumination light by the first light path folding section WF1. In the case shown in FIG. 2A, the illumination position of the illumination light is shifted as mach as a distance d from the initial position corresponding with the system optical axis SA1 by the separate angle adjustments of the pair of pivoted mirrors 14a, 14c forming the first light path folding section WF1. In the case shown in FIG. 2B, the illumination angle of the illumination light is shifted as mach as an angle θ from the initial direction parallel to the system optical axis SA1 by the separate angle adjustments of the pair of pivoted mirrors 14a, 14c forming the first light path folding section WF1. As is clear from the above, it is possible to separately adjust the illumination position and the illumination angle of the first light beam to be input to the homogenizing optical system 16 by appropriately adjusting the pivotal postures of the respective pivoted mirrors 14a, 14c provided to the first light path folding section WF1 with the respective support sections 31a, 33a. On this occasion, it is possible to make a computer calculate the amount of driving of the driving sections 32a, 34a for operating the respective support sections 31a, 33a, and thus it is possible to obtain a device capable of quickly adjusting the distance d and the angle θ alone described above.

Going back to FIG. 1, in the second light path folding section WF2, the first pivoted mirror 14b supported by the first support section 31b is driven by, for example, a drive section 32b to pivot appropriately around a pivot axis AX perpendicular to the sheet of the drawing including the system optical axis SA2, thereby adjusting the angle and position of the light beam traveling from the first pivoted mirror 14b towards the second pivoted mirror 14d. Further, the second pivoted mirror 14d supported by the second support section 33b is driven by, for example, a drive section 34b to pivot appropriately around a pivot axis AX perpendicular to the sheet of the drawing including the system optical axis SA2, thereby adjusting the angle and position of the light beam traveling from the second pivoted mirror 14d towards the third fixed mirror 14f. In a manner described above, it is possible to adjust the arrangement of the light path of the second light beam emitted from the second light source section 10b, namely the second illumination light path LP2 in the two steps in the second light path folding section WF2. In other words, since the second light path folding section WF2 is provided, it is possible to fine adjust the illumination position and the illumination angle of the illumination light as a second light beam entering the lens arrays 16a, 16b of the homogenizing optical system 16 from the second light source section 10b. It should be noted that the specific adjustment of the illumination position and the illumination angle of the illumination light by the second light path folding section WF2 is substantially the same as the adjustment of the illumination position and the illumination angle of the illumination light by the first light path folding section WF1 shown in FIGS. 2A and 2B, and therefore, the detailed explanation will be omitted.

The first condenser lens 12e supported by the third support section 36a is driven by, for example, a drive section 37a to appropriately move along the system optical axis SA1. Thus, it is possible to adjust, for example, the size of the light beam entering the second pivoted mirror 14c, and it is possible to reduce the possibility that the light beam is partially blocked due to the position misalignment of the light beam on the second pivoted mirror 14c caused in accordance with the pivotal movement of the first pivoted mirror 14a. Thus, it becomes possible to maximize the amount of the light taken out from the first light source section 10a, thereby maximizing the luminance of the projected image by the projector 100.

FIGS. 3A and 3B are diagrams for explaining the adjustment of the light beam size with the first condenser lens 12e. In the case in which the light beam is not sufficiently condensed at the second pivoted mirror 14c (see FIG. 3A) it is possible to make the beam diameter on the second pivoted mirror 14c to be sufficiently small (see FIG. 3B) by adjusting the arrangement of the first condenser lens 12e on the system optical axis SA1, thus blocking of the light beam, namely mechanical vignetting (diviating) can be prevented from occurring. It should be noted that as the factor of the variation in the size of the light beam entering the second pivoted mirror 14c, there can be cited a variation in profile irregularity or assembly accuracy of the first concave mirror 12c, a variation in lens effect of the first arc tube 12a, and so on.

Going back to FIG. 1, the second condenser lens 12f supported by the third support section 36b is driven by, for example, a drive section 37b to appropriately move along the system optical axis SA2. Thus, it is possible to adjust, for example, the size of the light beam entering the second pivoted mirror 14d, and it is possible to reduce the possibility that the light beam is partially blocked due to the position misalignment of the light beam on the second pivoted mirror 14d caused in accordance with the pivotal movement of the first pivoted mirror 14b. It should be noted that the adjustment of the beam diameter on the second pivoted mirror 14d with the movement of the second condenser lens 12f is substantially the same as the adjustment of the beam diameter on the second pivoted mirror 14c with the movement of the first condenser lens 12e shown in FIGS. 3A and 3B.

The homogenizing optical system 16 is provided with the pair of lens arrays 16a, 16b, a polarization conversion member 16c, and an overlapping lens 16d. The pair of lens arrays 16a, 16b among these constituents are each composed of a plurality of element lenses arranged in a matrix, and the element lenses divide the source light, which passes through the collimating lens 14h and is combined as described above, to be individually collected and/or diffused. The polarization conversion member 16c converts the source light emitted from the lens array 16a into, for example, the light with only the S-polarized component perpendicular to the sheet of FIG. 1, and supplies it to the subsequent optical system. The overlapping lens 16d appropriately collects the illumination light passing through the polarization conversion member 16c as a whole, thereby making it possible to illuminate, in an overlapping manner, the liquid crystal display devices of respective colors provided to the light modulation section 25. Specifically, the illumination light passing through the both lens arrays 16a, 16b and the overlapping lens 16d evenly illuminates, in an overlapping manner, the liquid crystal panels 25a, 25b, and 25c of the respective colors disposed in the light modulation section 25 after passing through the color separation system 23 (described below in detail).

It should be noted that it is preferable to align the incident position and the incident angle of the light beam entering the lens array 16a of the homogenizing optical system 16 from the first light source section 10a or the second light source section 10b using the light combining section 14 and the adjustment device 30, and thus the light source images of the respective arc tubes 12a, 12b, namely arc images formed on each of the cells of the lens array 16a can effectively be prevented from running off the cell.

The color separation system 23 is provided with first and second dichroic mirrors 23a, 23b, three field lenses 23f, 23g, and 23h as the correction optical system, and reflecting mirrors 23m, 23n, and 23o. Here, the first dichroic mirror 23a reflects, for example, blue light, and transmits red light and green light among the three colors of light of red, green, and blue. Further, the second dichroic mirror 23b reflects, for example, the green light and transmits the red light among the two colors of light of red and green input therein. In this color separation system 23, the substantially white source light from the homogenizing optical system 16 enters a first dichroic mirror 23a. The blue light reflected by the first dichroic mirror 23a enters the field lens 23f for adjusting the incident angle via the reflecting mirror 23m while staying as, for example, S-polarized light. Further, the green light transmitted by the first dichroic mirror 23a, and further reflected by a second dichroic mirror 23b enters a field lens 23g while staying as, for example, S-polarized light. Further, the red light passing through the second dichroic mirror 23b enters the field lens 23h via the lenses LL1, LL2, and the reflecting mirrors 23n, 23o while staying as, for example, S-polarized light. The lenses LL1, LL2 and the field lens 23h form a relay optical system. The relay optical system has a function of transmitting the image in the first lens LL1 to the field lens 23h via the second lens LL2 without any substantial modification.

The light modulation section 25 is provided with three liquid crystal panels 25a, 25b, and 25c, and three sets of polarizing dividing layers 25e, 25f, and 25g, disposed on both sides of the liquid crystal panels 25a, 25b, and 25c, respectively. Here, the liquid crystal panel 25a for the blue light disposed on the first optical path OP1 and the pair of polarization dividing layers 25e, 25e disposed on the both sides of the liquid crystal panel 25a form a liquid crystal light valve for the blue light for executing the luminance modulation on the blue light two-dimensionally in accordance with the image information. Similarly, the liquid crystal panel 25b for the green light and the corresponding polarizing dividing layers 25f, 25f disposed on the second optical path OP2 also form the liquid crystal light valve for the green light, and the liquid crystal panel 25c for the red light and the corresponding polarizing dividing layers 25g, 25g disposed on the third optical path OP3 also form the liquid crystal light valve for the red light.

The blue light, which is reflected by the first dichroic mirror 23a of the color separation system 23 to be branched, enters the first liquid crystal panel 25a for the blue light via the field lens 23f. The green light, which is reflected by the second dichroic mirror 23b of the color separation system 23 to be branched, enters the second liquid crystal panel 25b for the green light via the field lens 23g. The red light, which is transmitted through the second dichroic mirror 23b to be branched, enters the third liquid crystal panel 25c for the red light via the field lens 23h. Each of the liquid crystal panels 25a through 25c is a passive type liquid crystal display device for modulating the spatial intensity distribution of the incident illumination light for every pixel, and the three colors of light entering the respective liquid crystal panels 25a through 25c are modulated in accordance with the drive signals or image signals input to the respective liquid crystal panels 25a through 25c as electric signals. On this occasion, the polarization directions of the illumination light entering the liquid crystal panels 25a through 25c are adjusted by the polarizing dividing layers 25e, 25f, and 25g, and the component light with predetermined polarization direction is taken out from the modulated light emitted from each of the liquid crystal panels 25a through 25c as the image light.

The cross dichroic prism 27 is a light combining member and has a substantially rectangular planar shape formed of four rectangular prisms bonded with each other, and on the interfaces on which the rectangular prisms are bonded with each other, there is formed a pair of dielectric multilayer films 27a, 27b intersecting with each other forming an X-shape.

One of the pair of dielectric multilayer films, the first dielectric multilayer film 27a, reflects the blue light while the other of the pair of dielectric multilayer films, the second dielectric multilayer film 27b, reflects the red light. The cross dichroic prism 27 reflects the blue light from the liquid crystal panel 25a with the first dielectric multilayer film 27a to emit the blue light leftward in the traveling direction (upward in the sheet), transmits the green light from the liquid crystal panel 25b to emit the green light straight through the first and second dielectric multilayer films 27a, 27b, and reflects the red light from the liquid crystal panel 25c with the second dielectric multilayer film 27b to emit the red light rightward in the traveling direction (upward in the sheet).

The projection lens 29 projects the color image light combined by the cross dichroic prism 27 on the screen (not shown) with a desired magnification. Therefore, a color movie or a color still image corresponding to the drive signals or the image signals input to the respective liquid crystal panels 25a through 25c is projected on the screen with a desired magnification.

As is obvious from the above explanations, according to the projector 100 of the present embodiment, since the adjustment device 30 adjusts the arrangement of light paths of the first light beam from the first light source section 10a and the second light beam from the second light source section 10b in the two steps in the first light path folding section WF1 and the second light path folding section WF2, it becomes possible to individually adjust the first and second light beams from the respective light source sections 10a, 10b with respect to the incident position and the incident angle. Therefore, it becomes possible to combine the first and second light beams from the respective light source sections 10a, 10b without omission to enter the homogenizing optical system 16, thus uniformly illuminating the light modulation section 25 with a high luminance.

Further, particularly in the projector 100 of the present embodiment, the adjustment device 30 performs the adjustment of the light path by folding the first illumination light path LP1 in the two steps with the pivoted mirrors 14a, 14c disposed in the first light path folding section WF1, and performs the adjustment of the light path by folding the second illumination light path LP2 in the two steps with the pivoted mirrors 14b, 14d disposed in the second light path folding section WF2. On this occasion, since the adjustment of the illumination position and the illumination angle with the first light path folding section WF1 and the adjustment of the illumination position and the illumination angle with the second light path folding section WF2 are separated from each other, the size and arrangement of the light source images of the respective light source sections 10a, 10b formed in each of the cells of lens array 16b of the homogenizing optical system 16 can be adjusted precisely and independently.

Second Embodiment

Hereinafter, a projector according to a second embodiment will be explained. It should be noted that the projector according to the second embodiment is obtained by modifying the projector 100 according to the first embodiment, and therefore, it is assumed that the parts unless particularly explained are the same as in the case with the projector 100 according to the first embodiment.

Figure 4:
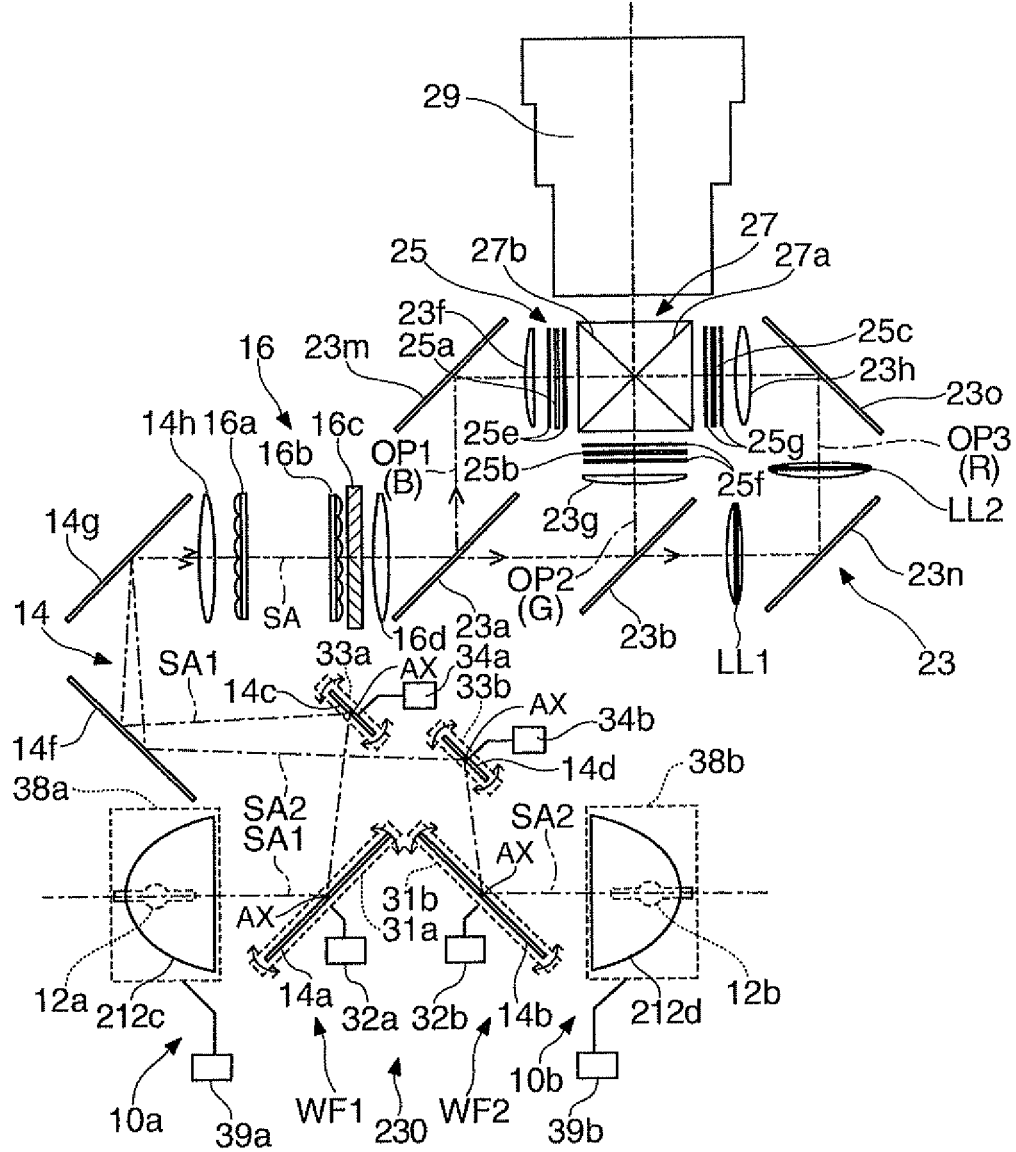
FIG. 4 is a diagram for explaining a projector according to a second embodiment of the invention.

FIG. 4 is a diagram for conceptually explaining the structure of the optical system of the projector according to the second embodiment. In the case of the projector 200, the first light source section 10a is composed of the first arc tube 12a and a first concave mirror 212c, and the first concave mirror 212c is an ellipsoidal mirror for reflecting the light beam from the first arc tube 12a while converging the light beam. Therefore, in the first light source section 10a, there is disposed no condenser lens on the posterior stage of the first concave mirror 212c. Further, the second light source section 10b is composed of the second arc tube 12b and a second concave mirror 212d, and the second concave mirror 212d is an ellipsoidal mirror for reflecting the light beam from the second arc tube 12b while converging the light beam. Therefore, also in the second light source section 10b, there is not disposed a condenser lens on the posterior stage of the second concave mirror 212d.

The first light source section 10a is supported by a third support section 38a provided to the adjustment device 230, and is driven by, for example, a drive section 39a to appropriately move along the system optical axis SA1. Thus, it is possible to adjust, for example, the size of the first light beam entering the second pivoted mirror 14c. It should be noted that the adjustment of the beam diameter on the second pivoted mirror 14c with the movement of the first light source section 10a is substantially the same as the adjustment of the beam diameter on the second pivoted mirror 14c using the movement of the first condenser lens 12e shown in FIGS. 3A and 3B.

The second light source section 10b is supported by a third support section 38b provided to the adjustment device 230, and is driven by, for example, a drive section 39b to appropriately move along the system optical axis SA2. Thus, it is possible to adjust, for example, the size of the second light beam entering the second pivoted mirror 14d. It should be noted that the adjustment of the beam diameter on the second pivoted mirror 14d with the movement of the second light source section 10b is substantially the same as the adjustment of the beam diameter on the second pivoted mirror 14c using the movement of the first condenser lens 12e shown in FIGS. 3A and 3B.

Third Embodiment

Hereinafter, a projector according to a third embodiment will be explained. It should be noted that the projector according to the third embodiment is obtained by modifying the projector 100 according to the first embodiment, and therefore, it is assumed that the parts unless particularly explained are the same as in the case with the projector 100 according to the first embodiment.

Figure 5:
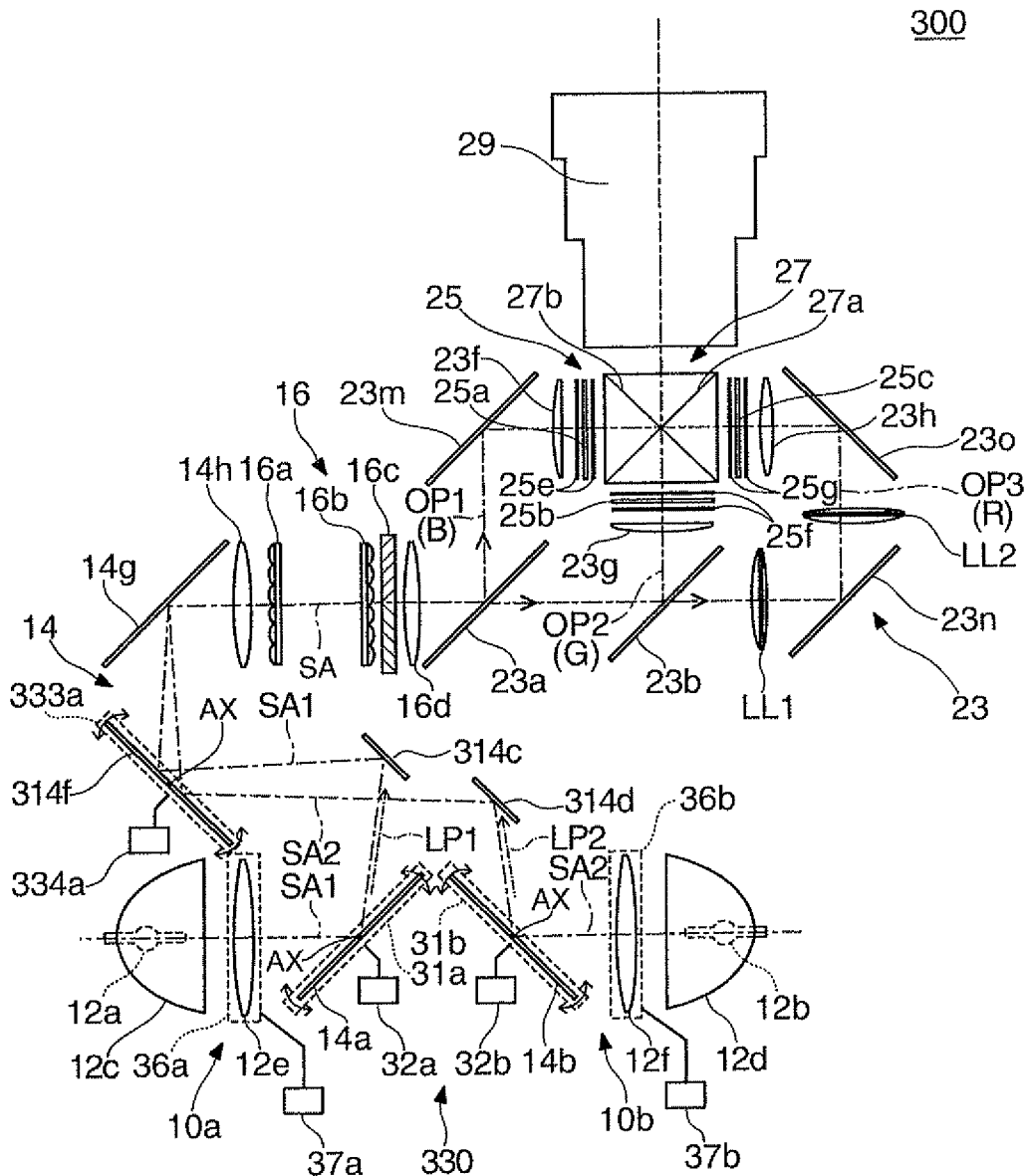
FIG. 5 is a diagram for explaining a projector according to a third embodiment of the invention.

FIG. 5 is a diagram for conceptually explaining the structure of the optical system of the projector according to the third embodiment. In the case of the projector 300, the adjustment device 330 is provided with the first support sections 31a, 31b, the second support section 333a, and the third support sections 36a, 36b. Here, the second support section 333a is provided instead of the second support section 33a shown in FIG. 1, and supports a third pivoted mirror 314f as a common mirror so that the third pivoted mirror 314f can pivot around a pivot axis AX perpendicular to the sheet of the drawing and can also be fixed. Since the second support section 333a is provided, the second fixed mirrors 314c, 314d are held at fixed postures. The second support section 333a is driven by the drive section 334a to operate, and adjusts the rotational positions of the pair of pivoted mirrors 14a, 314f individually in cooperation with the first support section 31a. Thus, it is possible to adjust the illumination position and the illumination angle of the first light beam to be input to the homogenizing optical system 16 from the first light source section 10a individually. Further, the second support section 333a adjusts individually the rotational positions of the pair of pivoted mirrors 14b, 314f in cooperation with the first support section 31b. Thus, it is possible to adjust the illumination position and the illumination angle of the second light beam to be input to the homogenizing optical system 16 from the second light source section 10b individually.

It should be noted although in the above explanations the third support sections 36a, 36b moves the condenser lenses 12e, 12f along the system optical axes SA1, SA2, it is also possible to move the first light source section 10a and the second light source section 10b along the system optical axes SA1, SA2 by substantially the same support sections. In this case, the condenser lenses 12e, 12f are eliminated in the respective light source sections 10a, 10b, and the concave mirrors 12c, 12d are formed as the ellipsoidal mirrors for convergence.

Fourth Embodiment

Hereinafter, a projector according to a fourth embodiment will be explained. It should be noted that the projector according to the fourth embodiment is obtained by modifying the projector 100 according to the first embodiment, and therefore, it is assumed that the parts unless particularly explained are the same as in the case with the projector 100 according to the first embodiment.

Figure 6:
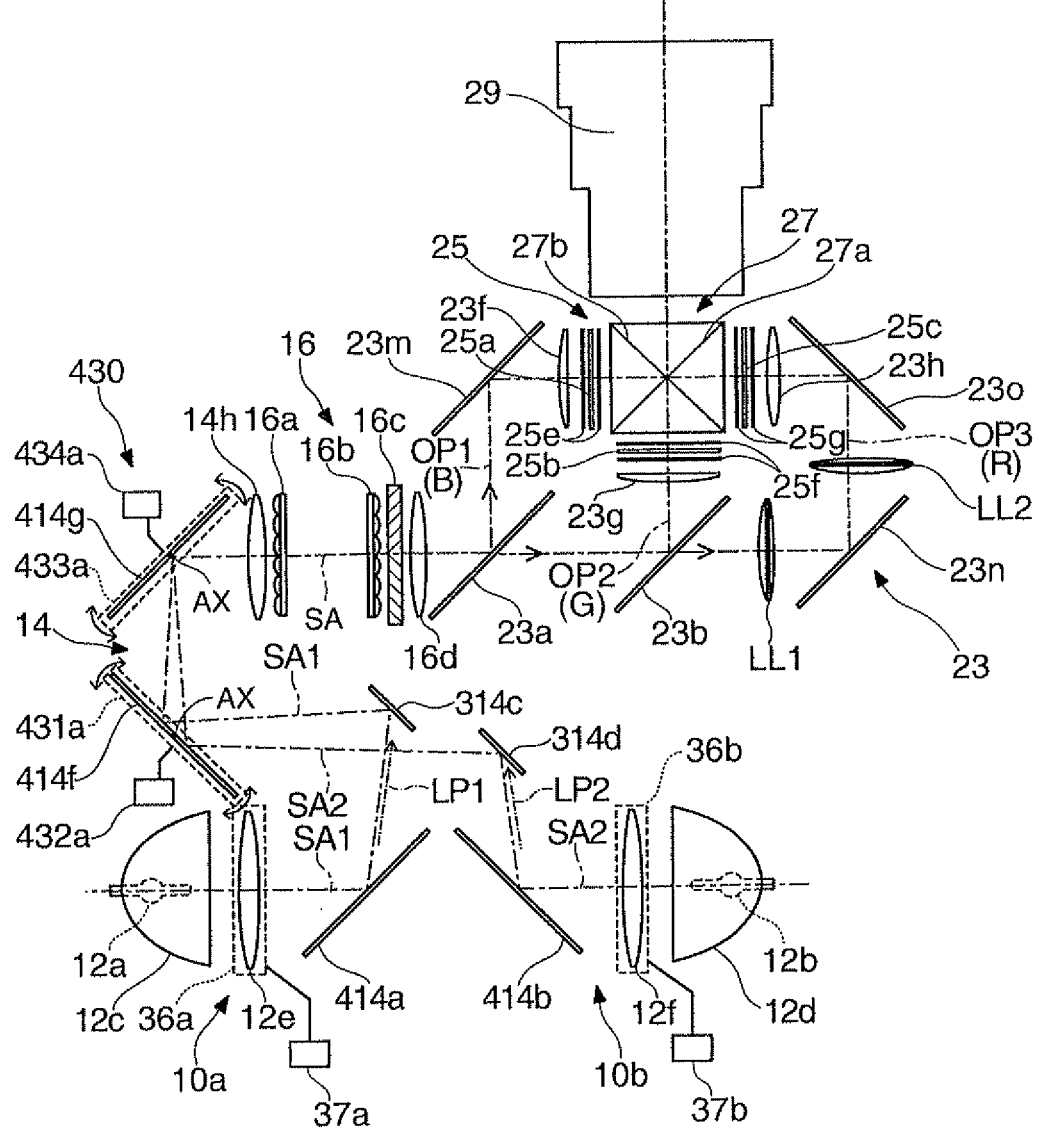
FIG. 6 is a diagram for explaining a projector according to a fourth embodiment of the invention.

FIG. 6 is a diagram for conceptually explaining the structure of the optical system of the projector according to the fourth embodiment. In the case of the projector 400, the adjustment device 430 is provided with the first support section 431a, the second support section 433a, and the third support sections 36a, 36b. Here, the first support section 431a is provided instead of the first support section 31a shown in FIG. 1, and the second support section 433a is provided instead of the first support section 33a shown in FIG. 1. Since the first support section 431a is provided, first fixed mirrors 414a, 414b are held at fixed postures. Further, since the second support section 433a is provided, the second fixed mirrors 314c, 314d are also held at fixed postures. The first support section 431a supports the third pivoted mirror 414f as a common mirror so that the third pivoted mirror 414f can pivot around the pivot axis AX perpendicular to the sheet of the drawing and can be fixed, the second support section 433a supports the fourth pivoted mirror 414g so that the fourth pivoted mirror 414g can pivot around the pivot axis AX perpendicular to the sheet of the drawing and can be fixed. The first support section 431a and the second support section 433a are respectively driven by the drive sections 432a, 434a to adjust the rotational positions of the pair of pivoted mirrors 414f, 414g individually. Thus, it becomes possible to adjust the illumination position and the illumination angle of the first and the second light beams to be input to the homogenizing optical system 16 from the first light source section 10a and the second light source section 10b.

It should be noted although in the above explanations the third support sections 36a, 36b moves the condenser lenses 12e, 12f along the system optical axes SA1, SA2, it is also possible to move the first light source section 10a and the second light source section 10b along the system optical axes SA1, SA2 by substantially the same support sections. In this case, the condenser lenses 12e, 12f are eliminated in the respective light source sections 10a, 10b, and the concave mirrors 12c, 12d are formed as the ellipsoidal mirrors for convergence.

Fifth Embodiment

Hereinafter, a projector according to a fifth embodiment will be explained. It should be noted that the projector according to the fifth embodiment is obtained by modifying the projector 300 according to the third embodiment, and therefore, it is assumed that the parts unless particularly explained are the same as in the case with the projector 300 according to the third embodiment.

Figure 7:
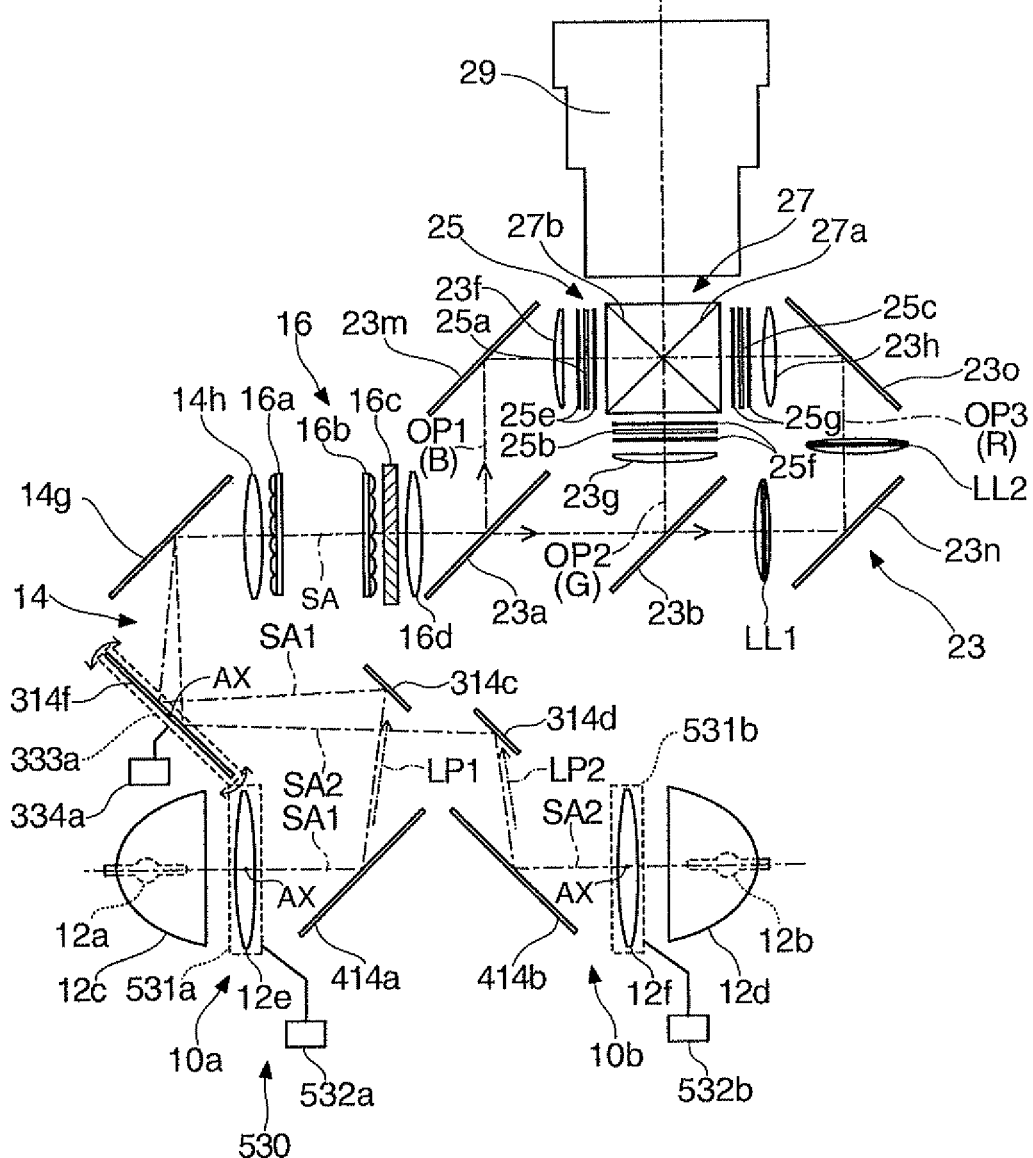
FIG. 7 is a diagram for explaining a projector according to a fifth embodiment of the invention.

FIG. 7 is a diagram for conceptually explaining the structure of the optical system of the projector according to the fifth embodiment. In the case of the projector 500, the adjustment device 530 is provided with the first support sections 531a, 531b and the second support section 333a. Here, the first support sections 531a, 531b are provided instead of the first support sections 31a, 31b shown in FIG. 5, and each can be driven respectively by the drive sections 532a, 532b to move the condenser lenses 12e, 12f of the first and second light source sections 10a, 10b in a direction (e.g., a direction parallel to the sheet of the drawing or a direction perpendicular to the sheet of the drawing) in the plane of perpendicular to the system optical axes SA1, SA2, respectively. Further, the second support section 333a supports the third pivoted mirror 314f so that the third pivoted mirror 314f can pivot around the pivot axis AX perpendicular to the sheet of the drawing and can be fixed. Thus, it is possible to adjust individually the illumination positions and the illumination angles of the first and second light beams to be input to the homogenizing optical system 16 from the respective light source sections 10a, 10b.

It should be noted that the first support sections 531a, 531b are not limited to move the condenser lenses 12e, 12f in the direction in the plane of perpendicular to the system optical axes SA1, SA2, but can be arranged to tilt the condenser lenses 12e, 12f in a desired direction with respect to the system optical axes SA1, SA2 as much as desired angles, respectively. In other words, the first support sections 531a, 531b can make the respective condenser lenses 12e, 12f pivot around the pivot axes AX to have desired angle conditions, respectively. On this occasion, the second support section 333a can be eliminated, and the third pivoted mirror 314f can be used in a fixed condition.

Further, it is possible to add a function of moving the condenser lens 12e along the system optical axis SA1 and a function of moving the condenser lens 12f along the system optical axis SA2 to the first support sections 531a, 531b, respectively. Thus, it is possible to adjust, for example, the sizes of the light beams entering the second fixed mirrors 314c, 314d.

Sixth Embodiment

Hereinafter, a projector according to a sixth embodiment will be explained. It should be noted that the projector according to the sixth embodiment is also obtained by modifying the projector 300 according to the third embodiment, and therefore, it is assumed that the parts unless particularly explained are the same as in the case with the projector 300 according to the third embodiment.

Figure 8:
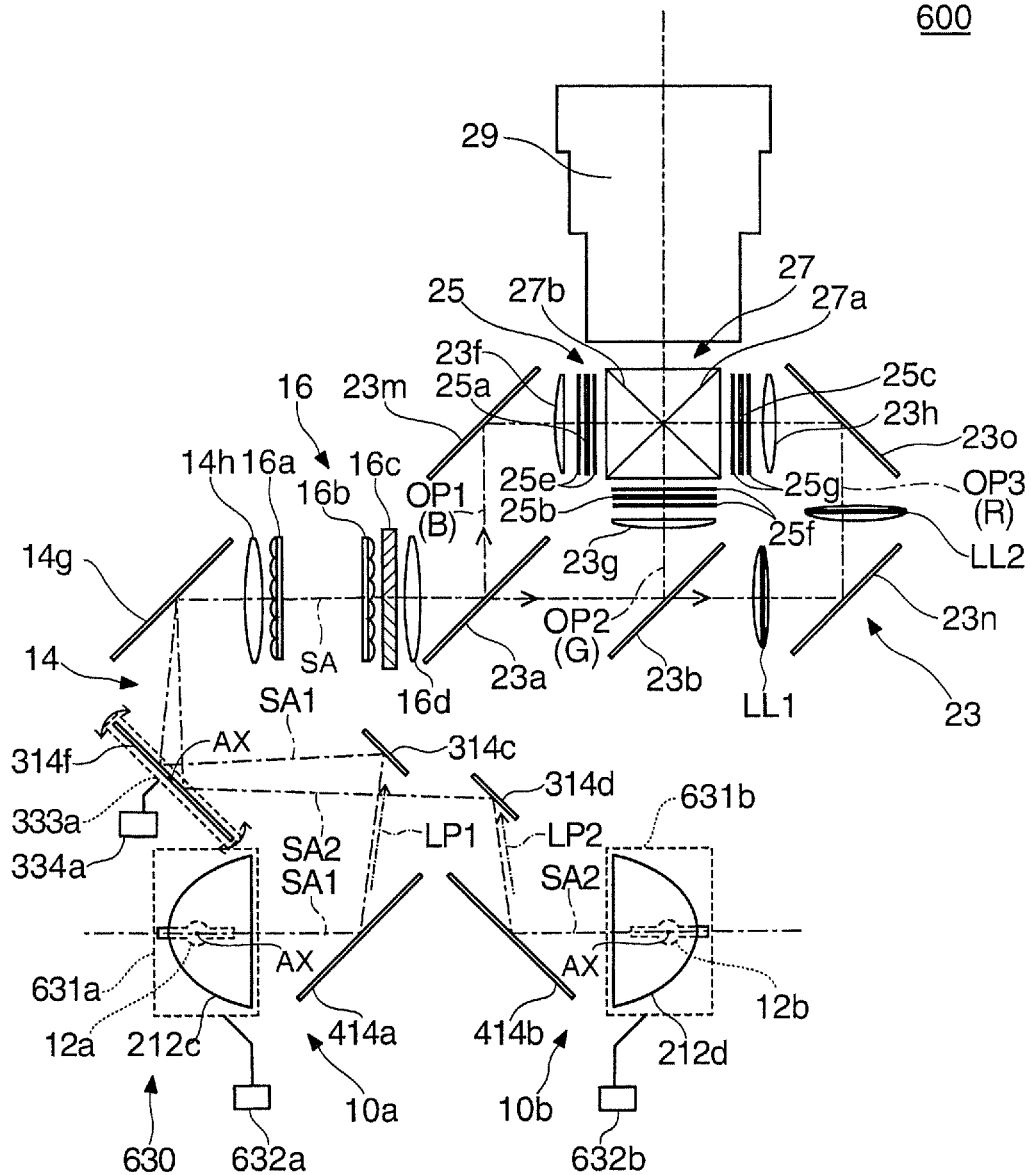
FIG. 8 is a diagram for explaining a projector according to a sixth embodiment of the invention.

FIG. 8 is a diagram for conceptually explaining the structure of the optical system of the projector according to the sixth embodiment. In the case of the projector 600, the adjustment device 630 is provided with the first support sections 631a, 631b and the second support section 333a. Here, the first support sections 631a, 631b are provided instead of the first support sections 31a, 31b shown in FIG. 5, and each can be driven respectively by the drive sections 632a, 632b to move the first and second light source sections 10a, 10b in a direction (e.g., a direction parallel to the sheet of the drawing or a direction perpendicular to the sheet of the drawing) in the plane of perpendicular to the system optical axes SA1, SA2, respectively. Here, the concave mirrors 212c, 212d provided to the respective light source sections 10a, 10b are each formed as an ellipsoidal mirror similarly to the case shown in FIG. 4. On the other hand, the second support section 333a supports the third pivoted mirror 314f so that the third pivoted mirror 314f can pivot around the pivot axis AX perpendicular to the sheet of the drawing and can be fixed. Thus, it is possible to adjust individually the illumination positions and the illumination angles of the first and second light beams to be input to the homogenizing optical system 16 from the respective light source sections 10a, 10b.

It should be noted that the first support sections 631a, 631b are not limited to move the light source sections 10a, 10b in the direction perpendicular to the system optical axes SA1, SA2, but can be arranged to tilt the light source sections 10a, 10b in a desired direction with respect to the system optical axes SA1, SA2 as much as desired angles, respectively. In other words, the first support sections 631a, 631b can make the respective light source sections 10a, 10b pivot around the pivot axes AX to have desired angle conditions, respectively. On this occasion, the second support section 333a can be eliminated, and the third pivoted mirror 314f can be used in a fixed condition.

Further, it is possible to add a function of moving the light source section 10a along the system optical axis SA1 and a function of moving the light source section 10b along the system optical axis SA2 to the first support sections 631a, 631b, respectively. Thus, it is possible to adjust, for example, the sizes of the first and second light beams entering the second fixed mirrors 314c, 314d.

Although the invention is explained along the embodiments described above, the invention is not limited to the above embodiments. For example, as the arc tubes 12a, 12b used in the light source sections 10a, 10b in the embodiments described above, various kinds of lamps such as a high-pressure mercury lamp or a metal-halide lamp can be cited.

Further, although in the projectors of the embodiments described above, a pair of lens arrays 16a, 16b are used for separating the combined light beams into a plurality of partial light beams, it is possible to use a rod integrator instead of the lens arrays 16a, 16b.

Further, although in the embodiments described above, there is used the polarization conversion member 16c for converting the combined light beams into a polarized beam with a specified direction, the invention can also be applied to the projectors which do not use such a polarization conversion member 16c.

Further, although in the embodiments described above, examples of the projector using three light modulation devices are explained, the invention can also be applied to a projector using the one, two, four, or more light modulation devices.

Further, although in the embodiment described above, an example of the case in which the invention is applied to the transmissive projector is explained, the invention can also be applied to reflective projectors. It should be noted here that "transmissive" denotes that the light valve including the liquid crystal display panel is a type of transmitting a light beam, and "reflective" denotes that the light valve is a type of reflecting a light beam. In the case with the reflective projector, the light valve can be composed only of the liquid crystal display panel, and accordingly, the pair of polarization plates can be eliminated. It should be noted that the light modulation device is not limited to the light valve composed of the liquid crystal display panel and so on, but can be a light modulation device using micro-mirrors, for example.

Further, as the projector, a front projector performing image projection form a direction of observing the projection screen and a rear projector performing image projection from the opposite direction of observing the projection screen can be cited, and the configurations of the projector 100 through 600 shown in FIGS. 1 through 8 can be applied to the both types of projectors.

The entire disclosure of Japanese Patent Application No. 2008-3969, filed Jan. 11, 2008 is expressly incorporated by reference herein.

What is claimed is:

1. A projector comprising:
a first light source section having a first arc tube and a first concave mirror and adapted to emit a first light beam;
a second light source section having a second arc tube and a second concave mirror and adapted to emit a second light beam;
a light combining section adapted to combine the first light beam and the second light beam;
an adjustment device adapted to adjust a light path of the first light beam and a light path of the second light beam, respectively, in two steps;
an homogenizing optical system adapted to equalize the first light beam and the second light beam processed by the light combining section;
a light modulation section adapted to modulate the light beam from the homogenizing optical system in accordance with image information;
a third mirror and a fourth mirror that guide both the first light beam and the second light beam to the homogenizing optical system, the third mirror and the fourth mirror being fixed mirrors; and
a projection optical system adapted to project an image beam processed by the light modulation section, wherein
the first concave mirror of the first light source section converges a light beam emitted from the first arc tube,
the second concave mirror of the second light source section converges a light beam emitted from the second arc tube,
the light combining section is provided with at least one mirror on each of an illumination path between the first light source section and the homogenizing optical system and an illumination path between the second light source section and the homogenizing optical system, and
the adjustment device individually displaces the first light source section and the second light source section in a predetermined direction in the plane of perpendicular to respective system optical axes, and changes an angle, at which respective one of the light paths is folded by the at least one mirror, thereby adjusting arrangement of the light paths.

2. The projector according to claim 1, wherein
the adjustment device adjusts the first light beam and the second light beam with respect to an illumination position and an illumination angle.

3. The projector according to claim 2, wherein
the light combining section includes,
a first light path folding section having two mirrors disposed on a first illumination light path between the first light source section and the homogenizing optical system so that the angles of the two mirrors can be adjusted while avoiding interference with the second light beam, and
a second light path folding section having two mirrors disposed on a second illumination light path between the second light source section and the homogenizing optical system so that the angles of the two mirrors can be adjusted while avoiding interference with the first light beam, the adjustment device folds each of the first illumination light path and the second illumination light path in two steps with the two mirrors provided to each of the first light path folding section and the second light path folding section, thereby adjusting an arrangement of the light paths.

4. The projector according to claim 2, wherein the light combining section includes, a first light path folding section having at least one mirror disposed on a first illumination light path between the first light source section and the homogenizing optical system so that the angle of the at least one mirror can be adjusted while avoiding interference with the second light beam, a second light path folding section having at least one mirror disposed on a second illumination light path between the second light source section and the homogenizing optical system so that the angle of the at least one mirror can be adjusted while avoiding interference with the first light beam, and a common mirror disposed at a position, at which the first illumination light path and the second illumination light path overlap with each other, so that an angle of the common mirror can be adjusted, and the adjustment device folds the first illumination light path in two steps with the at least one mirror and the common mirror disposed in the first light path folding section, and folds the second illumination light path in two steps with the at least one mirror and the common mirror disposed in the second light path folding section, thereby adjusting an arrangement of the light paths.

5. The projector according to claim 2, wherein the first light source section is provided with a first condenser lens on a posterior stage of the first arc tube and the first concave mirror, the second light source section is provided with a second condenser lens on a posterior stage of the second arc tube and the second concave mirror, the light combining section is provided with at least one mirror on each of an illumination path between the first light source section and the homogenizing optical system and an illumination path between the second light source section and the homogenizing optical system, and the adjustment device individually displaces the first condenser lens and the second condenser lens in a predetermined direction in the plane of perpendicular to respective system optical axes, and changes an angle, at which respective one of the light paths is folded by the at least one mirror, thereby adjusting arrangement of the light paths.

6. The projector according to claim 5, wherein the first condenser lens and the second condenser lens can individually be displaced along the system optical axes.

7. The projector according to claim 1, wherein the first light source section and the second light source section can individually be displaced along the system optical axes.

8. The projector according to claim 1, wherein the adjustment device comprises two adjustable mirrors that adjust the light path of the first light beam and two adjustable mirrors that adjust the light path of the second light beam.

* * * * *